UNITED STATES PATENT OFFICE.

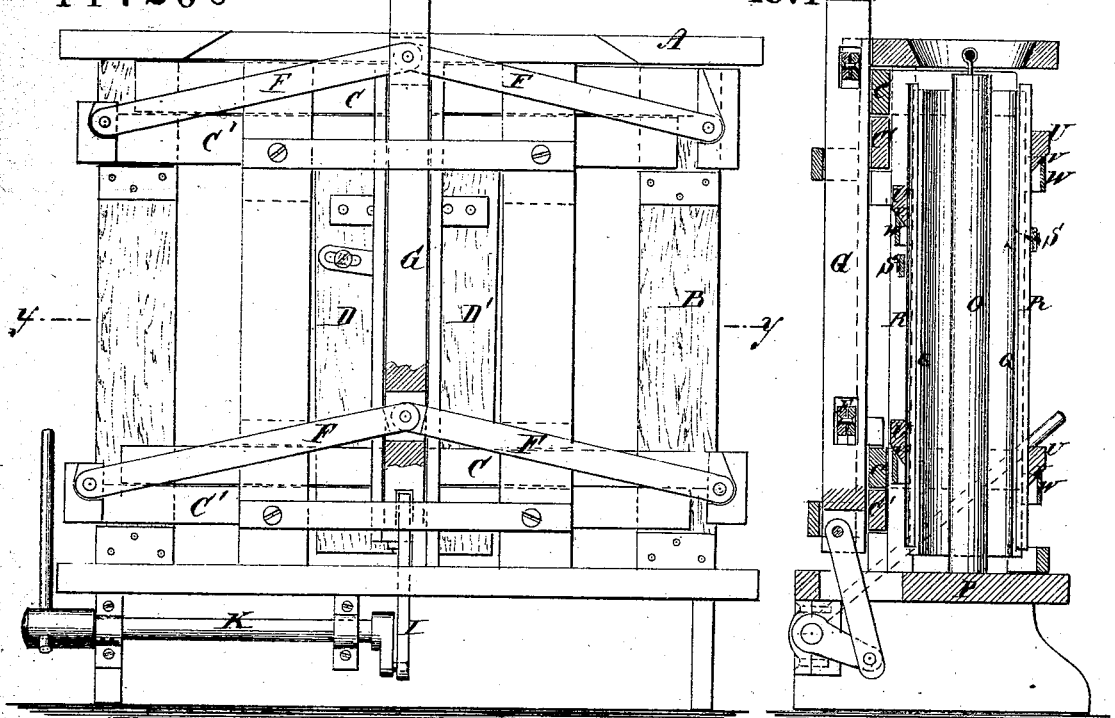
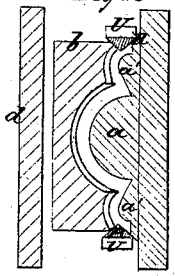
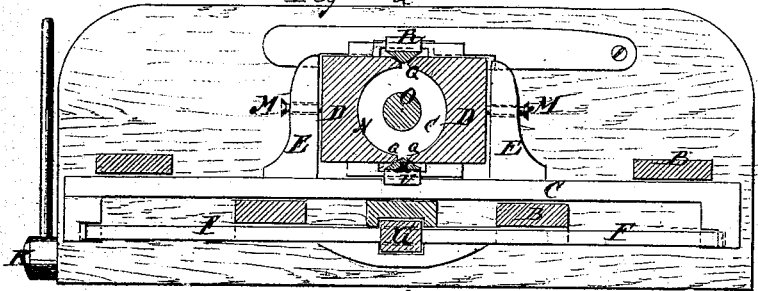
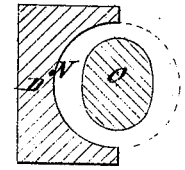
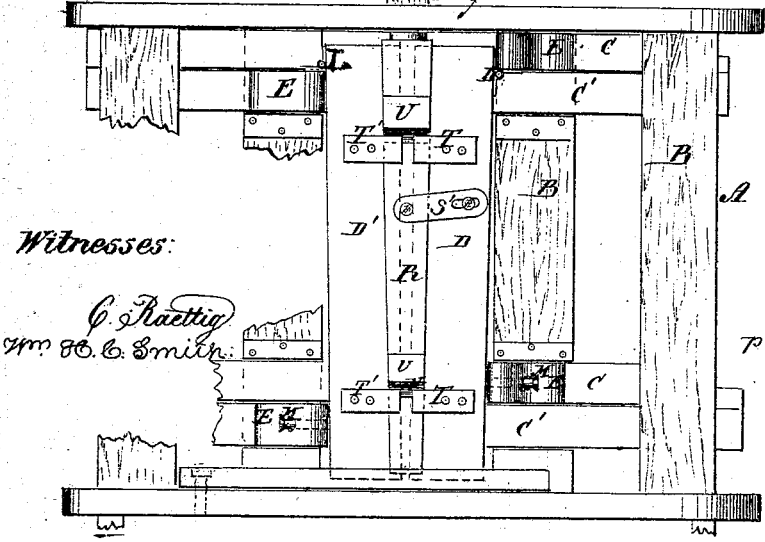

JOHN DEMAREST, OF MOTT HAVEN, NEW YORK, ASSIGNOR TO HIMSELF AND JORDAN L. MOTT, OF SAME PLACE.

IMPROVEMENT IN MOLDING-MACHINES.

Specification forming part of Letters Patent No. 117,266, dated July 25, 1871.

*To all whom it may concern:*

Be it known that I, JOHN DEMAREST, of Mott Haven, in the county of Westchester and State of New York, have invented a new and Improved Molding-Machine; and I do hereby declare that the following is a full, clear, and exact description thereof, which will enable others skilled in the art to make and use the same, reference being had to the accompanying drawing forming part of this specification.

My invention consists in the improvement of molding-machines, as hereinafter fully described and subsequently pointed out in the claim.

Figure 1 is a rear elevation of my improved molding-machine. Fig. 2 is a sectional elevation on the line $x\ x$ of Fig. 3. Fig. 3 is a horizontal section on the line $y\ y$ of Fig 1. Fig. 4 is a partial front elevation. Fig. 5 is a horizontal section of one of the flasks and the core-shaft, and Fig. 6 is a horizontal section of the flasks as they would be modified for making the molds for casting the pipe.

A is a strong frame of vertical timbers or bars B, of suitable height, according to the length of core it is desired to make. C and C' represent strong beams, comprising two pairs of slides, arranged to slide horizontally back and forth on said frame, one pair being near the upper ends of the beams B, and the other near the lower ends. D and D' represent the two parts of the mold which are connected to these slides by brackets E projecting horizontally from them at one side, D being connected to slides C, and D' to slides C'. Each pair of slides is connected by a pair of toggle-jointed arms, F, to a vertically-moving bar, G, which is connected by a rod, I, with a crank-shaft, K, which is oscillated by a lever or any other suitable means, by which the bar G for moving the molds toward or from each other may be worked. The said molds are preferably hinged to the brackets E of the upper pair of slides, as shown at L, and connected to the lower ones by bolts M, arranged to allow the brackets to recede a little before they move the molds to open wider at the top than at the bottom, so that the greater quantity of sand which would be at the bottom by reason of the packing of it at the bottom more closely than at the top, in consequence of falling the greater distance, will be compensated for by the greater opening at the top. Suitable stops may be provided to prevent the lower ends of the molds from going back as far as the brackets do by the pressing of the sand. These molds are provided with the semicircular grooves N, or grooves of other shape, according to the shape the core is required to be, and they are adjusted on the slides so as to be brought close together for packing the sand on the core-bar O, which is placed at the center between them on a stand, P, and supported at the top in any suitable way, the grooves of the molds being as much larger than the core-shaft O as the thickness that the sand is to be on it.

As the edges Q of the molds will be so separated when they are moved back to receive the loose sand that it would escape between them, I provide the triangular strips or gates R for covering the said openings, which strips are connected to one of the molds by a link, S, and cleats, T, the link holding it against the edge of the flask and allowing it to rise and fall, and the cleats T holding it from swinging away from the opening; also serving, in connection with other cleats, T', on the other flask, and cleats U on the said strips with beveled lower edges V, to force the strips up and allow them to recede when the molds come together, as it is necessary for them to recede from the space between the molds, and so that when the molds separate again they will fall back by their gravity to the position for closing the openings. The strips are caused to recede by the action of the edges Q of the molds on the beveled sides of the said strips, and this forces them up; also by the action of the beveled blocks V, on the cleats T T', which are rabbeted so that the parts W, Fig. 2, whereon the said cleats V work, are as far from the sides of the molds as the thickness of the strips R. These gates may be connected in like manner to both sections of the mold, or they may be hinged to one and confined to the other by any suitable means by which they may be closed as the molds open. As the movements of the molds on the parts at and about the edges Q are not so directly toward the core-shaft as the movements of the parts at the bottom of the grooves, it follows that the sand would be packed much harder on the sides opposite the bottoms of the molds than at the sides opposite the edges Q; consequently I propose, especially when forming large cores, to make the core-shaft oval, as represented in Fig. 5, and arrange the shortest diameter in the plane of the movements of the molds, so that there will be a greater thickness of sand thereat, which, although moved more toward the core-bar, will not be packed harder than at the opposite sides of the core-shaft. I propose, also, to make use of this plan of operating molds for forming cores to make the molds for casting the pipe, in which case a pattern, a, would be substituted for one of the molds to be used in connection with flask b, instead of a core-mold, which would be attached to the brackets E, so as to be removed readily after the sand is packed in it with the other part for casting; or the pattern a, with its support b, may be removed and another flask arranged in place of it for closing with flask a, and strong plates or beams will be arranged behind the flasks for driving keys between them and the flasks for holding them together firmly to prevent springing when the sand is being pressed; or other means for securing them may be employed. The molds a will have ribs a' attached for making the molds for the running in of the metal. The sand will be sifted in from above, between the flask and the pattern, when they are separated, in this case as in the other and the flask and pattern will be pressed together to pack the sand and complete the shape. The gates R will also be used in this case as in the other. I do not propose to limit myself to the vertical rod G, and the toggle-jointed arms for working the flasks or molds, for other obvious arrangement of means may be employed and perhaps with as good results; although this arrangement has the quality of increasing the pressure on the sand as the resistance increases, and is therefore especially favorable to the requirements of the case. I may work the bar G by means of a rack and pinion instead of the toggle-jointed arms.

Having thus described my invention, I claim as new and desire to secure by Letters Patent—

1. In combination with sections D D', the brackets E E and the two pairs of slides C C', arranged as and for the purpose specified.

2. The combination of toggle-joint device F G, slides C C', and brackets E E, arranged as described to form a convenient mechanism for reciprocating the sections, in the manner specified.

3. The combination of the sections D D' with brackets E E, bolted firmly to one another at the bottom, but hinged loosely together at the top to allow the upper part of the mold to spread open a little, as and for the purpose specified.

4. The triangular gates arranged and operating in the manner specified, and for the purpose set forth.

5. The construction of the core O in an oval form, with its shortest diameter in the line of movement of the sections D D', as and for the purpose specified.

JOHN DEMAREST.

Witnesses:
GEO. W. MABEE,
ALEX. F. ROBERTS.